June 22, 1943.   W. C. GROENIGER   2,322,631
COMBINED VACUUM BREAKER AND CHECK VALVE
Filed June 13, 1940
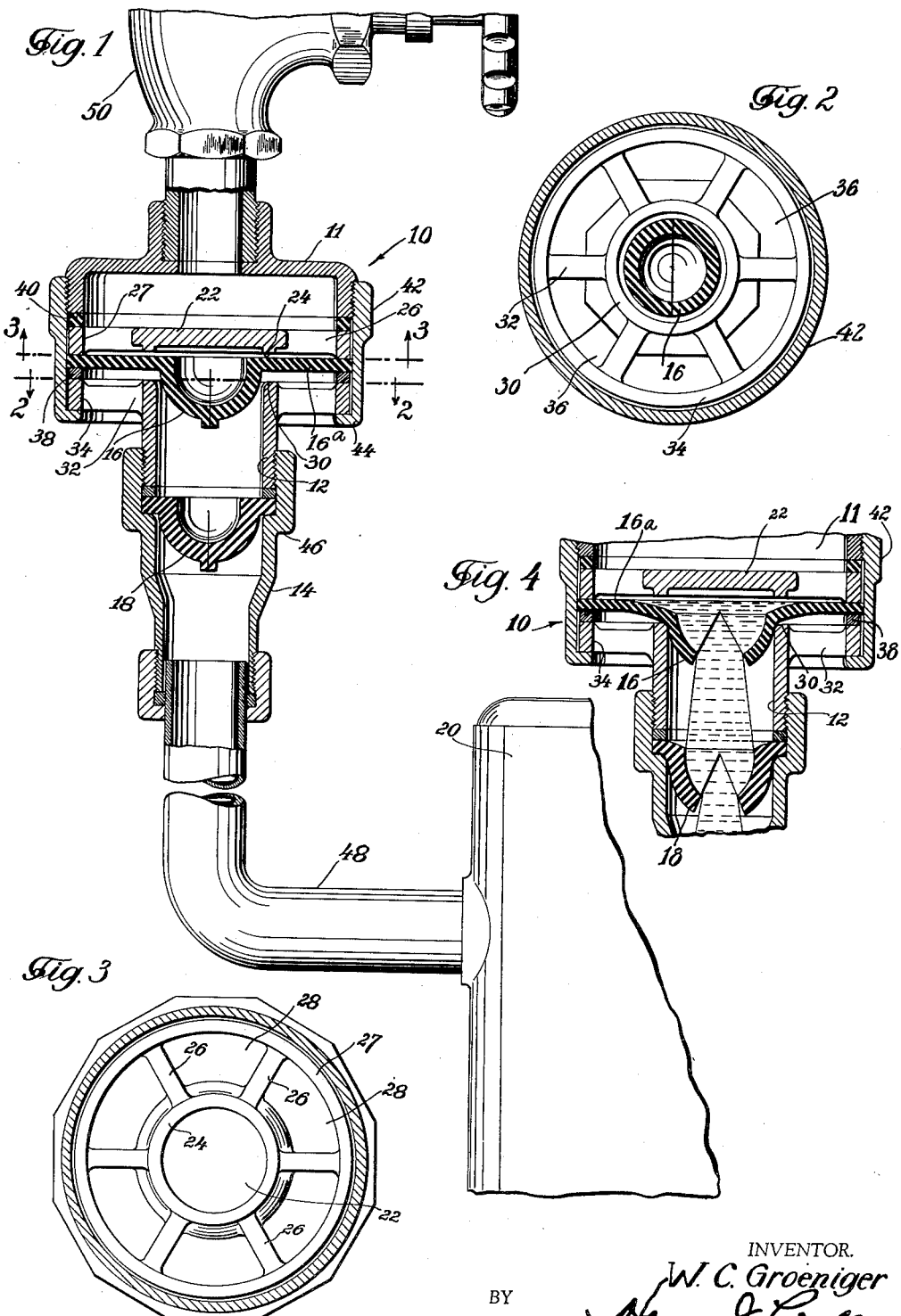
INVENTOR.
W. C. Groeniger
BY
ATTORNEY.

Patented June 22, 1943

2,322,631

UNITED STATES PATENT OFFICE 2,322,631

COMBINED VACUUM BREAKER AND CHECK VALVE

William C. Groeniger, Columbus, Ohio, assignor to John B. Pierce Foundation, New York, N. Y., a corporation of New York Application June 13, 1940, Serial No. 340,371

1 Claim. (Cl. 277—70)

The present invention relates to improvements in combined vacuum breakers and check valves.

In particular, the invention relates to an improved vacuum breaker and check valve for plumbing systems wherein a connection is made between the potable water supply distribution system of a building and a pressure vessel, such, for example, as the connection between the potable water supply of a building and a house heating boiler or like unit, the water content of which may be under substantial pressure and contaminated with dirt, grease, or the like.

Among the objectives of the present invention, the following may be considered illustrative:

To provide vacuum breaker and check valve means whereby in the circumstance of a break or the like in the potable water supply distribution system, or the circumstance of a vacuum condition therein, back flow of water from the pressure vessel into the potable water supply system will be prevented, and pressure within the vessel will be maintained;

To provide combined vacuum breaker and check valve means embodying a plurality of normally closed self-closing elements arranged in tandem, one of said elements being disposed in operative relationship with a valve seat adjacent to which are air intake ports communicating directly with the outer atmosphere;

To provide combined vacuum breaker and check valve means embodying a plurality of valve elements in tandem, discharge of fluid through the anterior valve element being at accelerated velocity and impinging directly against the posteror valve element, whereby said latter element is subjected to scouring action at each valve operation; and To provide self-policing vacuum breaker and check valve means in which failure of a mechanical element of said check valve means is immediately evidenced by abnormal operation of the device, to wit, by the discharge of water through openings normally serving only to admit air to the piping system to dissipate a vacuum condition existing therein.

The improved vacuum breaker and check valve means, pursuant to the present invention comprises a body portion subdivided into a plurality of valve chambers. At the upstream side of such valve body, there is disposed a combined valve seat and baffle means operating to divert inflowing water to flow passages disposed marginally of the valve body. Disposed beneath such flow passages and in operative relation thereto is provided a resilient check valve member having a normally closed self-closing aperture; operatively associated with such resilient check valve means, and disposed beneath the annular rim portion thereof, are a plurality of passages open to the atmosphere, said passages being closed against outward liquid flow by the operation of the resilient check valve member during the stage of water flow. The discharge portion of the improved check valve means is provided with a second resilient check valve member embodying a normally closed self-closing opening, said check valve member being arranged to open under pressure flow of liquid through the first-mentioned valve member, for discharge of liquid into the pressure vessel or like apparatus. Said second check valve member seals against back flow from said pressure vessel, and, therefore, in the circumstance of a negative pressure within the inflow chamber of the valve means, passage of liquid from the pressure vessel into the inlet portion of said check valve means is precluded by the action of the check valve elements. Assuming failure of the first-mentioned valve element, the baffle means diverts water from normal flow into the outlet valve chamber to a point of discharge through the air intake means, thus apprising the operator or other user of the system of such mechanical valve element failure. In the circumstance of failure of the second check valve means, pressure flow of fluid from the pressure vessel will discharge through the stated air ports, but the closure of the first-mentioned valve element against back flow nevertheless precludes contamination of the potable water supply of the building, by effectively checking flow from the pressure vessel into the inlet side of the valve, and thence into the potable water supply system.

Other features and advantages will hereinafter appear.

In the accompanying drawing:

Fig. 1 represents, in sectional elevation, the improved self-policing check valve and back pressure control, pursuant to the present invention; such figure illustrates, schematically, the connection of such valve means with a suitable pressure vessel;

Fig. 2 is a section taken on the line 2—2 of Fig. 1, illustrating the air intake means and the relation thereof to the resilient valve element;

Fig. 3 is a section taken on the lines 3—3 of Fig. 1, illustrating the baffle means and the water flow passages formed thereby; and Fig. 4 represents a portion of the valve of Fig.

1, showing the action of the valve during the stage of water flow therethrough.

Referring to the drawing, the improved check valve and vacuum breaker 10 comprises an inlet body portion 11, a central body 12, and a discharge body portion 14. Within said body portions are disposed two normally closed self-closing valve members 16, 18, desirably of the "teat" valve type, and respectively arranged between said inlet and central body portions, and between said central and said discharge body portions.

Desirably, said check valve and vacuum breaker 10 is so disposed with respect to the pressure or like vessel 20 as to position valve 18 above the level of water within said pressure vessel; valve 18 is, under such circumstances, normally dry.

It will be noted that valve members 16, 18, are relatively closely spaced in axial alignment; as indicated in Fig. 4, valve 16 discharges directly into the cupped portion of valve 18, whereby the fluid discharge of valve 16 is most effective to open valve 18 for flow of fluid into vessel 20.

Valve inlet body portion 11 includes a central imperforate baffle member 22, near the outer edge of which is provided machined valve seat means 24 for operative association with valve 16, as later described. The mean diameter of valve seat 24 is greater than the mean diameter of valve 16, see Fig. 1, whereby said valve seat 24 is operatively associated with the diaphragm or rim portion 16a of valve 16. Baffle 22 is centrally disposed with respect to an outer annular rim 27 by the radial members 26, such radial members defining flow passages 28.

The central portion, 12, of valve 10 is provided with annular valve seat means 30, the radius of which is preferably equal to the radius of valve seat means 24 of baffle means 22. Integral ribs 32 terminate in an outer circular rim 34; such ribs 32 and rim 34 define passages 36, see Fig. 2.

As clearly shown in Fig. 1, valve element 16 is formed with a broad, flat rim 16a, the outer diameter of which may be equal to the outer diameters of rims 27 and 34 respectively; valve 16 may be, therefore, secured in operative position by clamping the outer edge thereof between said rims.

To afford suitable flexibility of action and cooperation with valve seats 24 and 30, valve 16 is positioned suitably intermediate such seats 24 and 30; with respect to valve seat 24, such spacing may be had by having the lowermost edge of rim 27 project below valve seat 24; with respect to seat 30, it is desirable to employ an intermediate washer 38, whereby the relation between valve 16 and valve seat 30 and between valve 16 and valve 18 may be accurately established.

Gasket 40 may be employed to render the composite valve inlet chamber 11 watertight, and coupling nut 42, the inwardly turned flange 44 of which engages with rim 34, integrates the various elements into an operative whole.

Valve 18 is positioned with respect to intermediate valve body portion 12 and discharge body 14 by clamping the rim thereof against a shoulder 46 formed in body outlet portion 14.

Any suitable means may be employed to connect valve 10 to tank inlet pipe 48; at valve inlet portion 11 there is illustrated, fragmentarily, any suitable valve 50, manually or automatically operable to fill vessel 20.

During the stage of flow through valve 10, fluid impinges on baffle 22 and is diverted thereby to pass downwardly through passages 28 against rim portion 16a of valve 16, moving such rim portion into engagement with lower valve seat 30, and sealing off passages 32 thereby. Under the pressure of the fluid, teat valve 16 is opened, and a fan-wise discharge of water, at increased velocity due to the relatively restricted opening through valve 16, impinges with substantial force directly against the cupped upper wall portions of valve 18, opening said valve to permit water flow to pressure vessel 20.

Such operation of valve 10 is schematically shown in Fig. 4. In Fig. 4, however, indication of water flow into and through the upper body 11 is omitted, for clarity of representation.

The increased velocity and resultant increased kinetic energy of fluid flow within intermediate chamber 12, and the direct impingement of fluid with substantial force against valve 18, makes it practicable to employ a valve 18 having a heavy-walled body, with resulting increase in the life of such valve.

Additionally, the passage of fluid through lower valve element 18 under substantial velocity serves to scour the faces of the valve, keeping the same free of deposits of scale or the like which may interfere with the closure of the valve.

Upon cessation of fluid flow, valves 16, 18, assume normally closed status, whereupon valve 18 prevents any loss of pressure of vessel 20.

In the circumstance of a negative pressure in valve inlet chamber 11, as a vacuum within the fluid supply distribution system, and assuming valve 50 to be open, the negative pressure within chamber 11 will cause valve 16 to close tightly, and the rim 16a thereof to move upwardly into engagement with valve seat 24 under the influence of atmospheric pressure exerted through apertures 28.

Assuming a complete failure, or unauthorized removal of valve 16, and a condition of sub-atmospheric pressure within valve body portion 11 or the piping connecting thereto, the closure of valve 18 prevents escape of fluid or loss of pressure from vessel 20, and the stated sub-atmospheric pressure will be dissipated by inflow of air through ports 28.

The operator of the system will be apprised of such failure or removal of valve 16 by the escape of fluid through ports 36 when valve 50 is opened to replenish the fluid within tank 20.

Assuming failure of valves 16 and 18 simultaneously, and assuming a further extreme circumstance of coincident sub-atmospheric pressure within valve chamber 11 or the piping associated therewith, fluid driven out of vessel 20 under the pressure therein will impinge against baffle 22 and will be diverted to discharge through apertures 36. Prior to such discharge, however, air will have passed through said apertures 36 and through apertures 28 to alleviate the vacuum condition within valve chamber 11 and the associated piping. Fluid from tank 20 will not pass into valve chamber 11 or its associated piping.

Whereas I have described my invention by reference to a specific form thereof, it will be understood that many changes and modifications may be made without departing from the spirit of the invention.

I claim:

A valve comprising, in combination, a body having in inlet chamber, an open-ended cylindrical central body chamber of uniform diameter adjustably positioned with respect thereto, and a discharge chamber; said inlet chamber including a centrally disposed baffle plate having, on its lower face, a peripheral valve seat; teat valve means disposed within said inlet chamber beneath said baffle plate and including a flexible, imperforate rim portion and a centrally disposed hemispherical teat valve, the mean diameter of said hemispherical teat valve being less than the mean diameter of said valve seat, whereby the said valve seat is in operative association with said flexible rim; the upper rim of said cylindrical central body portion comprising a valve seat for cooperation with the underside of the flexible rim of said teat valve; the valve portion of said teat valve forming, when in open status, a restricted orifice disposed axially of said inlet chamber and said central body chamber; and a second substantially hemispherical teat valve embodying a normally closed slit opening disposed in axial alignment with the valve orifice of said first-named teat valve at the opposite end of said central body chamber; said second named teat valve being so positioned with respect to said first teat valve that it is in the zone of accelerated velocity of fluid flow through the restricted orifice opening of said first teat valve, whereby to utilize the kinetic energy of fluid flow therethrough to open said second teat valve by direct impingement of said fluid flow against the hemispherical portion thereof; said valve body having air ports communicating with the outer atmosphere peripherally of said central body chamber and beneath the valve seat thereof, the rim portion of said first named teat valve being normally out of contact with the respective upper and lower valve seat means, whereby in the circumstance of an unbalance of pressure on opposite sides of said first named teat valve an excess of pressure above the valve causes the rim thereof to seat upon the valve seat of said central body portion to close off communication between the atmosphere and said central body portion and an excess of pressure beneath the valve causes the rim thereof to seat against the upper valve seat while concomitantly opening communication between the atmosphere and said central body portion.

WILLIAM C. GROENIGER.